March 7, 1950 G. A. KENDALL 2,499,509
LATHE
Filed March 5, 1945 2 Sheets-Sheet 1
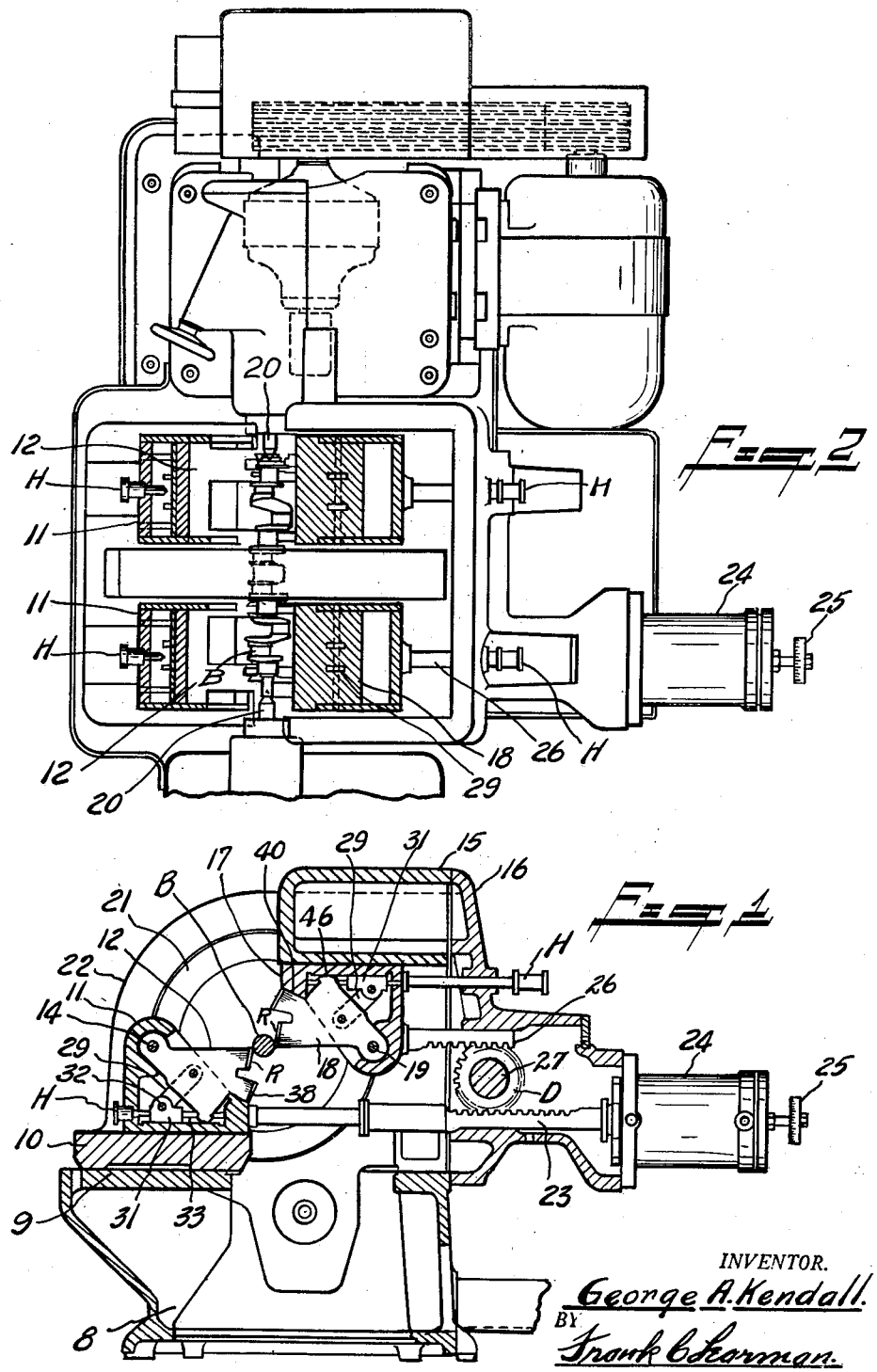
INVENTOR.
George A. Kendall.
BY Frank C. Sharman.
Attorney.

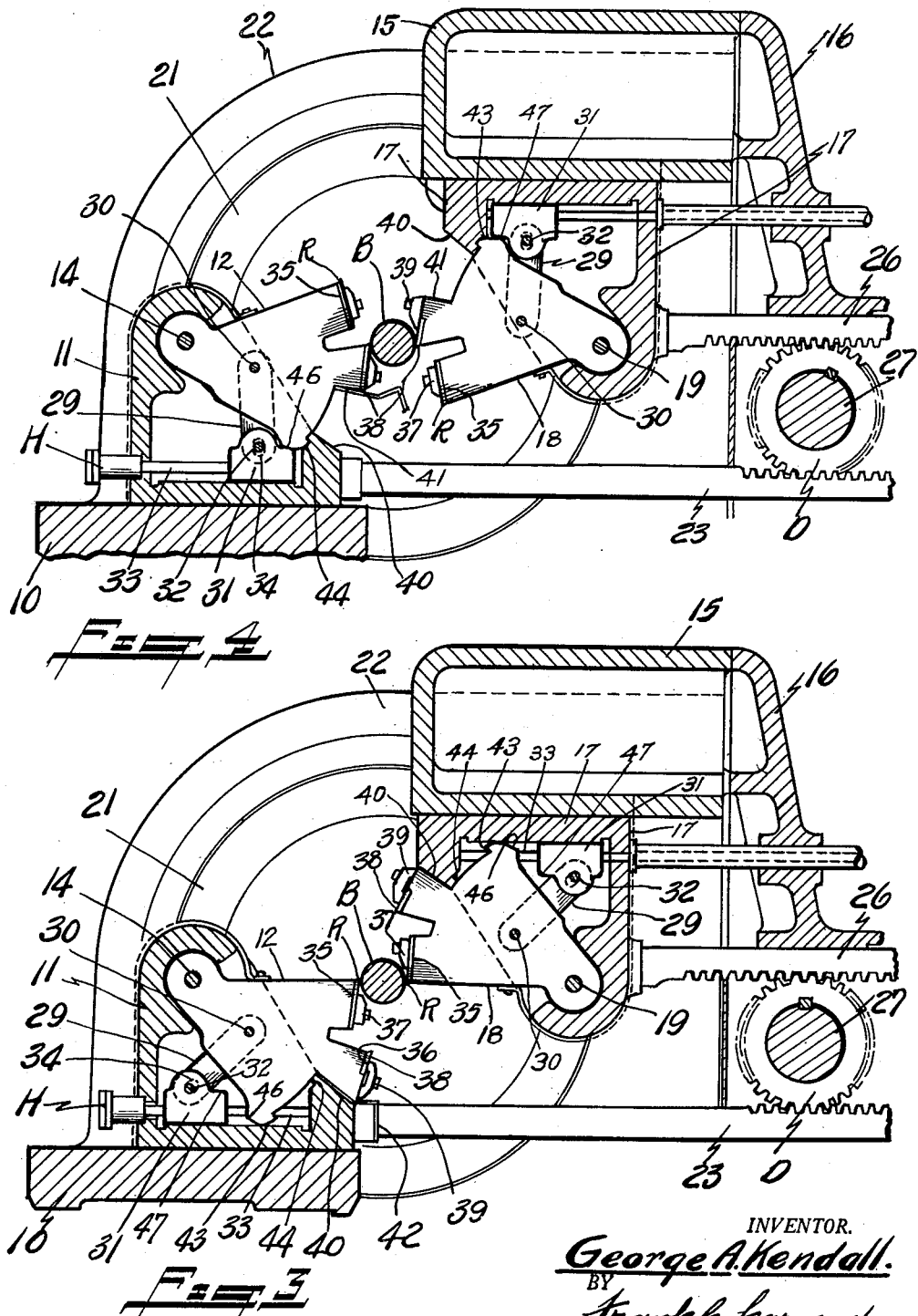

Patented Mar. 7, 1950

2,499,509

UNITED STATES PATENT OFFICE 2,499,509

LATHE

George A. Kendall, Saginaw, Mich., assignor to Wickes Bros., Saginaw, Mich., a corporation of Michigan Application March 5, 1945, Serial No. 580,947

2 Claims. (Cl. 82—25)

This invention relates to lathes for machining the main line bearings, stub end, flange and oil slinger complete on crankshafts for engines and similar parts.

One of the prime objects of the invention is to design a lathe of the multiple tool type in which a work piece, such as the crankshaft of an automobile engine or the like, is rotated co-axially with the center line of the lathe, while one or more of the crankshaft bearings and cheek surfaces are rough turned and then finished turned by tools fed in from opposite sides of the "work," thus completing the work in one chucking.

Another object is to design a lathe provided with opposed tool slides including pivotally mounted tool holders, each holder being mounted to swing or oscillate about a fixed center and having roughing and finishing tools mounted thereon, which tools are progressively movable into and out of engagement with the "work" as the tool ho'ders are swung so that both rough turning and finish cutting can be accomplished at one chucking of the work piece, thereby insuring the finishing cut in exact register with the roughing cut, and eliminating any possibility of mismatching as frequently occurs when the roughing cut is done in one machine and the work piece then removed and rechucked in another machine equipped with finishing tools for finishing.

A further object is to provide a lathe having pivotally mounted, opposed tool holders movable toward and away from the work piece and each other, each holder having roughing and finishing tools mounted thereon, so that each pair of opposed roughing tools, and each pair of finishing tools operate in unison as the cutting operations proceed.

A further object still is to provide tool blocks or slides on which the tool holders are mounted including contact surfaces engageable by and against which the tool holders seat and bear during the cutting operations.

Still a further object is to provide simple and practical means for oscillating the tool holders in properly timed relation to bring the tools, in regular order, into position to engage the "work."

Still a further object is to design a rugged compact lathe having an unusual degree of accuracy, which has a high rate of production, which is substantially automatic in its operation, and which, at the same time, shall be inexpensive to build and maintain.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a part-sectional end-elevational view of my improved lathe.

Fig. 2 is a fragmentary top plan view thereof.

Fig. 3 is a fragmentary, enlarged side-elevational view showing the rough turning tools in engagement with the work piece.

Fig. 4 is a view similar to Fig. 3 and showing the tool holders swung to bring the finishing tools into engagement with the work piece.

Referring now more specifically to the drawings in which I have shown one of the preferred embodiments of my invention.

The numeral 8 indicates the base of a crankshaft lathe which is provided with ways 9, on which a front slide base 10 is slidably mounted, a tool block 11 is mounted on said slide, and a tool holder 12 is pivotally connected thereto by means of the pin 14.

A back tool housing slide base 15 forms a part of the lathe structure, and a back plate 16 is secured thereto, an inverted tool block 17 being slidably connected to said base, and a tool holder 18 is pivotally connected to said block by means of the pin 19.

Conventional center spindles 20 form a part of the lathe as usual, and the work piece B is clamped therebetween, the drive means being of conventional design, the drive gear hub being indicated at 21, and a gear housing 22 is provided as usual.

The instant invention is directed to the tool blocks, tool holders, and the means for actuating same, and I therefore do not deem it necessary to describe the lathe in detail, excepting the parts associated with and that actuate said tool blocks and holders, also, inasmuch as the tool holders and blocks are nominally identical in construction and operation, a description of but one unit will suffice for both.

The tool blocks 11 and 17 are adjustably mounted on the slides 10 and 15, and one end of a combined piston rack push rod 23 is connected to the front block 11, the opposite end of the rod extending into a feed cylinder 24 and having a piston (not shown) mounted therein, said piston and rod being pressure actuated and are controlled by manipulation of a graduated wheel 25. An upper rack push rod 26, similar to rod 23, is connected to the tool block 17 and in the same manner.

A driven shaft 27 is journaled in bearings (not shown) provided in the back plate 16, and a drive pinion D is mounted thereon, said pinion having toothed engagement with the rack push rod members 23 and 26 so that as the gear is driven, one tool block unit will be advanced, while the other unit will be simultaneously retracted.

The tool holders 12 and 18 are mounted to oscillate about the pivot pins 14 and 19, and links 29 are pivotally connected to each tool holder by means of pins 30 and to a cross-head 31 by means of pins 32, each cross-head being slidably mounted on transversely disposed guides 33, and the tool holders are suitably recessed to accommodate the necessary link movement, the one end of each link 29 having an elongated opening 34 to permit the required swinging movement of the holder.

The cross-heads 31 are preferably pressure actuated, hydraulic cylinders H being connected thereto and to any convenient source of controlled pressure supply, so that the cross-heads may be adjusted on the guides to swing the tool holders to predetermined position, this pressure actuating means being omitted from the drawings and description, as it is well known in the prior art and does not form an essential part of the invention.

The cutting tools proper are mounted on the tool holders, seats 35 and 36 being provided on the outer free end of the holder as shown, roughing tools R being clamped in position on the seat 35 by means of the clamp and bolt assembly 37, and finishing tools 38 are spaced from the roughing tools and are held in position on the seat 36 by a clamp and bolt assembly 39 in exactly the same manner.

Bearing surfaces 40 are provided on the tool blocks 11 and 18 and the shouldered sections 41 of the tool holders bear thereon, to take the thrust when the rough cutting tools are cutting under load, a sheet metal lip 42 being provided to deflect the cuttings (not shown), and I wish to direct attention to the fact that the cutting tools engage the work at approximately diametrically opposite points of the work piece so there can be no deflection and the cutting thrusts will be evenly balanced.

When the rough cutting operation is completed, the drive pinion D is rotated to move the tool blocks from each other and provide clearance to permit the tool holders to swing about the pivot pins to position shown in Fig. 4 of the drawings, this is accomplished by the application of pressure to the hydraulic cylinder H to move the cross-heads 31 on the guides 33, swinging the front tool holder upwardly, and the opposite back tool holder downwardly until the shouldered section 43 of the holders engage the stops 44 on the slides and the contact surfaces 46 of the holder engage the contact surfaces 47 of the crosshead 31, thus forming a bearing surface to take the thrust load when the finish cutting tools are cutting under load.

Upon completion of the finish cutting operation, the machining is completed, the drive pinion is again rotated to shift the tool holders from each other, and the pressure is then reversed to bring the tool holder back to original position preparatory to removal of the finished work and mounting of another work piece in the lathe.

It is to be understood of course, that the lathe is adaptable for tooling operations on other types of work pieces and that modifications within the scope of the claims is contemplated.

What I claim is:

1. In a lathe having means for supporting and rotating a work piece, front and back tool blocks mounted on said lathe, a tool holder pivotally mounted on each tool block and having angularly spaced apart roughing and finishing tools mounted thereon, a cross-head on each block, links pivotally connected to said cross-heads and to the holders at a point spaced from its pivotal connection to the block, pressure actuated means for shifting said cross-heads to move the roughing tools into the cutting circle of the work piece, and the finishing tools out of said circle and vice versa, bearing surfaces on the blocks and crossheads respectively for engagement by said holders in their various positions of adjustment and means for transversely shifting said tool holders, in opposite directions, for simultaneous feeding in the backing out movement of the cutting tools.

2. The combination set forth in claim 1 in which the cross-heads form contact and bearing surfaces for the tool holders to take the thrust when the finishing tools are cutting under load.

GEORGE A. KENDALL.

REFERENCES CITED

The following references are of record in the file of this patent:

UNITED STATES PATENTS

| Number | Name | Date |
| --- | --- | --- |
| 1,815,012 | Schellenbach | July 14, 1931 |
| 2,173,609 | Groene | Sept. 19, 1939 |
| 2,238,019 | Floeter | Apr. 8, 1941 |
| 2,348,052 | Boillat | May 2, 1944 |